G. ANDREW, C. H. SLOACOMBE & H. H. KINGHAM
AUTOMATIC OIL FEED FOR MOTOR CARS.
APPLICATION FILED DEC. 11, 1914.
1,155,168.
Patented Sept. 28, 1915.
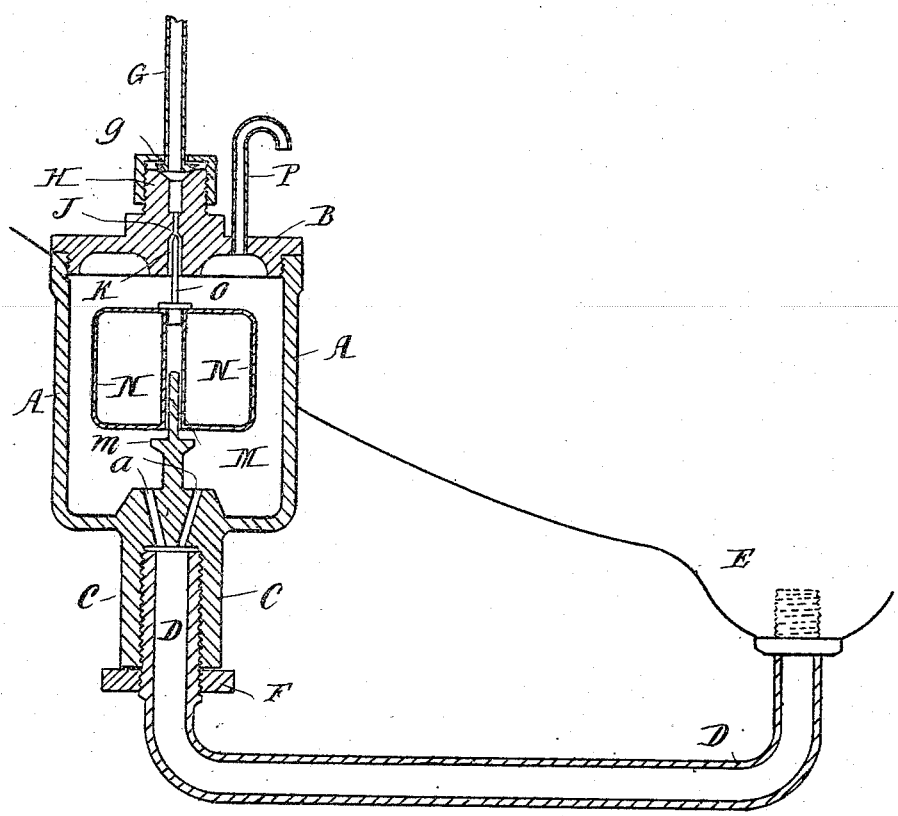
WITNESSES
INVENTORS
G. ANDREW, C.H. SLOACOMBE & H.H. KINGHAM
BY
ATTORNEY

UNITED STATES PATENT OFFICE.

GORDON ANDREW, CHARLES HENRY SLOACOMBE, AND HENRY HILL KINGHAM, OF TIMARU, NEW ZEALAND.

AUTOMATIC OIL-FEED FOR MOTOR-CARS.

1,155,168.  Specification of Letters Patent.  Patented Sept. 28, 1915.

Application filed December 11, 1914. Serial No. 876,744.

*To all whom it may concern:*

Be it known that we, GORDON ANDREW, CHARLES HENRY SLOACOMBE, and HENRY HILL KINGHAM, subjects of the King of Great Britain, residing at Timaru, New Zealand, have invented a new and useful Automatic Oil-Feed for Motor-Cars; and we do hereby declare the following to be a full, clear, and exact description of the same.

This invention relates to an automatic control for governing the supply of lubricating oil to the oil sumps of motor car engines and by means of which the oil supply to such sump is automatically maintained at a constant level.

The invention consists in arranging a float chamber about the same level as the oil sump and connecting the bottom of such chamber with the bottom of the oil sump through a constantly open connection. The upper end of the chamber is connected with the oil reservoir through a pipe having a valve seat opening that is adapted to be closed by a needle valve attached to a float arranged within the chamber when such float rises. The level of oil within the chamber will correspond with that of the oil in the oil sump of the engine and the float and needle valve are so adjusted as to cause the valve to be closed and the supply of oil shut off when the level of oil in the sump is at the required height. As it falls below such height the float will fall and allow fresh quantities to flow into the float chamber from the reservoir. An air vent is provided in the top of the float chamber to insure of the free flowing of the oil therefrom.

The accompanying drawing is a sectional elevation of the feeder and showing its arrangement with respect to the engine oil sump which latter is indicated in diagram.

A is the float chamber that is made of suitable material and of any desired capacity. Its upper end is closed by the screw cover B in order to allow of its inspection and cleansing whenever required. At its lower end it is formed with a female threaded socket piece C that screws over one end of the pipe connection D and which pipe connection leads into the bottom of the engine sump E. The level of the chamber A may thus be adjusted in relation to the oil sump E by screwing the socket piece up or down on this pipe and it is held in the desired position by means of the lock nut F screwed upon the pipe end beneath it.

Any desired number of oil outlets $a$ lead from the bottom of the chamber A into the socket piece C so that the oil flowing therefrom may pass into the pipe D and along it to the engine sump.

G is the pipe leading from the oil reservoir and this pipe is connected by the union $g$ with a nipple fitting H upon the chamber cover B. The passage through this nipple fitting is formed at its inner end as a needle valve seat J opening into a guide bore K in the cover.

A central guide stem M projects upward from the bottom of the chamber A and on it the float N is mounted so as to be free to rise and fall. The stem is provided with a stop $m$ at a point a distance from its bottom, on which the float will rest when it is in the lowered position and thereby be prevented from closing the outlets $a$. To the top of the float is fixed the needle valve O which passes loosely into the bore K of the chamber cover and is adapted to fit into the valve seat J and seal the opening when the float is raised.

P is the air vent tube passing into the top of the chamber A and preferably bent over at its top to prevent the entry of dirt or the like.

In operation the oil level in the chamber A will be the same as that required in the oil sump and the chamber is so adjusted in its height that, when the oil is at such level, the float will be raised to close the needle valve. As the oil in the engine sump is used up and the level falls there is a corresponding fall in the chamber A so that the float will drop and remove the needle valve from its seat and thereby allow enough oil to flow in from the reservoir to restore the oil level to its original state. The level of the oil in the engine sump is therefore automatically maintained.

What we do claim as our invention, and desire to secure by Letters Patent is:—

An automatic oil feed for motor cars having engine oil sumps, consisting of an oil chamber, a pipe connection leading from the bottom of such chamber into the bottom of the engine oil sump, means for adjusting the height of the oil chamber in relation to such sump, an oil supply pipe leading into the top of the oil chamber and having a needle valve seating at its inlet into such chamber, a float mounted in such chamber, a needle valve attached to the float and adapted to fit into the needle valve seating when the float is raised, and an air vent in the top of the oil chamber, substantially as specified.

In testimony whereof, we have signed this specification in the presence of two subscribing witnesses.

GORDON ANDREW.
CHARLES HENRY SLOACOMBE.
HENRY HILL KINGHAM.

Witnesses:
GEORGE JOHN WALLAS,
JAMES EDWARD STOKES JACKSON.